(12) United States Patent
Yuyama et al.

(10) Patent No.: US 9,674,634 B2
(45) Date of Patent: Jun. 6, 2017

(54) USER INTERFACE DEVICE, SOUND CONTROL APPARATUS, SOUND SYSTEM, SOUND CONTROL METHOD, AND PROGRAM

(71) Applicant: Yamaha Corporation, Hamamatsu-shi, Shizuoka (JP)

(72) Inventors: Yuta Yuyama, Hamamatsu (JP); Atsushi Usui, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 14/917,428

(22) PCT Filed: Aug. 13, 2014

(86) PCT No.: PCT/JP2014/071398
§ 371 (c)(1),
(2) Date: Mar. 8, 2016

(87) PCT Pub. No.: WO2015/037388
PCT Pub. Date: Mar. 19, 2015

(65) Prior Publication Data
US 2016/0227342 A1    Aug. 4, 2016

(30) Foreign Application Priority Data

Sep. 12, 2013  (JP) .................................. 2013-189260
Dec. 27, 2013  (JP) .................................. 2013-271313

(51) Int. Cl.
*H04R 5/02*   (2006.01)
*H04S 7/00*   (2006.01)
*G06F 3/16*   (2006.01)

(52) U.S. Cl.
CPC ................ *H04S 7/40* (2013.01); *G06F 3/162* (2013.01); *H04S 7/30* (2013.01); *H04S 7/305* (2013.01);
(Continued)

(58) Field of Classification Search
CPC ... H04S 7/40; H04S 7/30; H04S 7/305; G06F 3/162
See application file for complete search history.

(56) References Cited

U.S. PATENT DOCUMENTS 6,538,672 B1 *  3/2003  Dobbelaar ......... H04N 5/44543
                                                                          348/E5.105
6,747,678 B1    6/2004  Katayama et al.
(Continued)

FOREIGN PATENT DOCUMENTS

JP    10-145900 A     5/1998
JP    2000-356990 A   12/2000
(Continued)

OTHER PUBLICATIONS

International Search Report (PCT/ISA/220 & PCT/ISA210) issued in PCT Application No. PCT/JP2014/071398 dated Sep. 9, 2014 with English translation (five pages).
(Continued)

*Primary Examiner* — Simon Sing
(74) *Attorney, Agent, or Firm* — Crowell & Moring LLP

(57) ABSTRACT

A user interface device includes: a display unit that displays a user interface screen associated with a first coordinate axis, the first coordinate axis corresponding to a first attribute of a sound field and being allocated with a plurality of parameters related to the first attribute; a first specification unit that specifies a coordinate value of the first coordinate axis corresponding to a position in the user interface screen specified by a user; and a second specification unit that
(Continued)

specifies a value of each of the plurality of parameters, based on the specified coordinate value.

9 Claims, 6 Drawing Sheets

(52) U.S. Cl.
CPC ....... *H04S 2400/11* (2013.01); *H04S 2400/15* (2013.01)

(56) References Cited

U.S. PATENT DOCUMENTS

| | | |
|---|---|---|
| 7,050,869 B1 | 5/2006 | Katayama et al. |
| 2003/0091204 A1 | 5/2003 | Gibson |
| 2013/0162649 A1* | 6/2013 | Oshima ................. G06T 11/206 |
| | | 345/440 |

FOREIGN PATENT DOCUMENTS

| | | |
|---|---|---|
| JP | 2000-356994 A | 12/2000 |
| JP | 2002-328768 A | 11/2002 |
| JP | 2006-197508 A | 7/2006 |
| JP | 2006-267226 A | 10/2006 |
| WO | WO 2012/160415 A1 | 11/2012 |

OTHER PUBLICATIONS

Extended European Search Report issued in counterpart European Application No. 14843566.2 dated Apr. 18, 2017 (ten (10) pages).

\* cited by examiner

*FIG. 1*
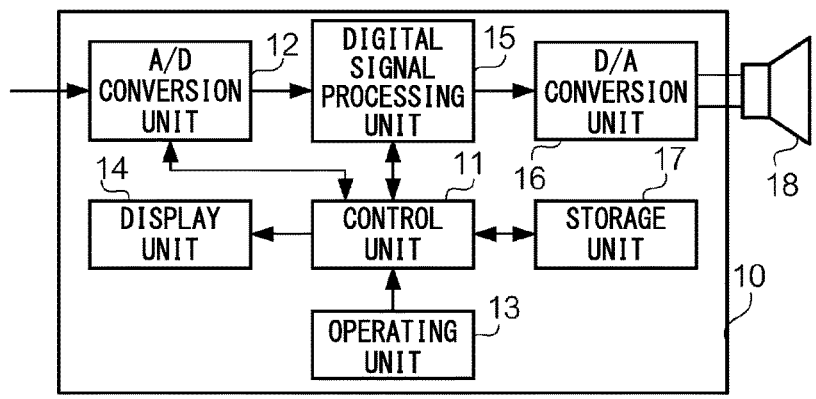
*FIG. 2*
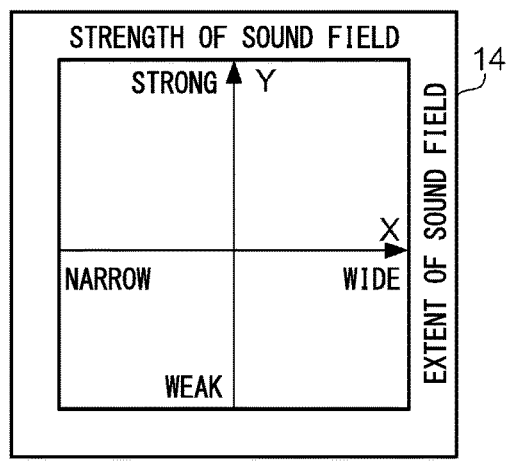
*FIG. 3*
X AXIS (EXTENT OF SOUND FIELD)
|  | MINIMUM VALUE | CENTRAL VALUE (DEFAULT VALUE) | MAXIMUM VALUE |
| --- | --- | --- | --- |
| Initial Delay | 15ms | 20ms | 90ms |
| Room Size | 0.2 | 1 | 2 |
| Liveness | 6 | 5 | 3 |
Y AXIS (STRENGTH OF SOUND FIELD)
|  | MINIMUM VALUE | CENTRAL VALUE (DEFAULT VALUE) | MAXIMUM VALUE |
| --- | --- | --- | --- |
| DSP Level | -6dB | 0dB | 3dB |

|  | MINIMUM VALUE | CENTRAL VALUE (DEFAULT VALUE) | MAXIMUM VALUE |
|---|---|---|---|
| DSP Level | -6dB | 0dB | 3dB |
| Initial Delay | 10ms | 20ms | 90ms |
| Room Size | 0.2 | 1.0 | 2.0 |
| Liveness | 6 | 5 | 3 |
| Rev.Level | 20% | 50% | 80% |
| Rev.Time | 1.0s | 2.0s | 3.0s |
| Rev.Delay | 50ms | 100ms | 150ms |

USER INTERFACE DEVICE, SOUND CONTROL APPARATUS, SOUND SYSTEM, SOUND CONTROL METHOD, AND PROGRAM

TECHNICAL FIELD

The present invention relates to a technique that realizes a sound field desired by a user.

Priority is claimed on Japanese Patent Application No. 2013-189260 filed on Sep. 12, 2013, and Japanese Patent Application No. 2013-271313 filed on Dec. 27, 2013, the contents of which are incorporated herein by reference.

BACKGROUND ART

A specific example of a parameter for realizing a sound field includes initial delay, room size, and liveness. Technical knowledge is required to know which parameter of a plurality of parameters to set to which value. If a user has limited knowledge, it is difficult to sensuously recognize a relation between the parameter and the sound field. Accordingly, it is difficult for such a user to set the parameter.

In Patent Documents 1 to 3, examples of a mechanism to support setting of the parameters are described. Patent Document 1 describes that size and color of an image corresponding to a type of the parameter to be changed are changed according to the parameter value and displayed on a setting screen, by selecting a parameter value. Patent Document 2 describes that when a user selects a desired DSP mode, only a slide bar of the parameter corresponding to the selected DSP mode is displayed. Patent Document 3 describes that a movement locus of a sound image in a space around a user is specified beforehand, and the image sound is moved so as to follow the locus to realize an image in which it looks as if, for example, a motorbike runs around a listener, tracing an ellipse or a circle, or an image in which a train passes from diagonally rearward to diagonally forward.

PRIOR ART DOCUMENTS

Patent Documents

[Patent Document 1] Japanese Unexamined Patent Application, First Publication No. 2000-356990
[Patent Document 2] Japanese Unexamined Patent Application, First Publication No. 2000-356994
[Patent Document 3] Japanese Unexamined Patent Application, First Publication No. H10-145900

SUMMARY OF THE INVENTION

Problem to be Solved by the Invention

In a mechanism described in Patent Documents 1 and 2, the user can understand a relation between the parameter and the sound field. However, ultimately the user needs to specify a parameter value point by point. In a mechanism described in Patent Document 3, it is intended to just change a position of the sound image, and attributes of the sound field such as extent of the sound field and strength of the sound field cannot be changed.

Therefore an exemplary object of the present invention is be able to realize a sound field having attributes desired by the user, without specifying the respective parameter values point by point.

Means for Solving the Problem

A user interface device according to an aspect of the present invention includes: a display unit that displays a user interface screen associated with a first coordinate axis, the first coordinate axis corresponding to a first attribute of a sound field and being allocated with a plurality of parameters related to the first attribute; a first specification unit that specifies a coordinate value of the first coordinate axis corresponding to a position in the user interface screen specified by a user; and a second specification unit that specifies a value of each of the plurality of parameters, based on the specified coordinate value.

A sound control apparatus according to an aspect of the present invention includes: the above-mentioned user interface device; and a signal processing unit that performs signal processing for realizing a sound field, based on the value of each of the plurality of parameters specified by the user interface device.

A sound system according to an aspect of the present invention includes a sound control apparatus and sound apparatus independent of each other. The sound control apparatus includes: a display unit that displays a user interface screen associated with a first coordinate axis, the first coordinate axis corresponding to a first attribute of a sound field and being allocated with a plurality of parameters related to the first attribute; a first specification unit that specifies a coordinate value of the first coordinate axis corresponding to a position in the user interface screen specified by a user; a second specification unit that specifies a value of each of the plurality of parameters, based on the specified coordinate value; and a transmission unit that transmits the specified value of each of the plurality of parameters to the sound apparatus. The sound apparatus includes: a reception unit that receives the transmitted value of each of the plurality of parameters, and a signal processing unit that performs signal processing for realizing a sound field, based on the received value of each of the plurality of parameters.

A sound control method according to an aspect of the present invention includes: displaying a user interface screen associated with a first coordinate axis, the first coordinate axis corresponding to a first attribute of a sound field and being allocated with a plurality of parameters related to the first attribute; specifying a coordinate value of the first coordinate axis corresponding to a position in the user interface screen specified by a user; and specifying a value of each of the plurality of parameters, based on the specified coordinate value.

A program according to an aspect of the present invention causes a computer to execute: displaying a user interface screen associated with a first coordinate axis, the first coordinate axis corresponding to a first attribute of a sound field and being allocated with a plurality of parameters related to the first attribute; specifying a coordinate value of the first coordinate axis corresponding to a position in the user interface screen specified by a user; and specifying a value of each of the plurality of parameters, based on the specified coordinate value.

BRIEF DESCRIPTION OF THE DRAWINGS

FIG. 1 is a block diagram showing a configuration of a sound control apparatus according to an embodiment of the present invention.

FIG. 2 is a diagram showing an example of a user interface screen displayed on a display unit of the sound control apparatus shown in FIG. 1.

FIG. 3 is a diagram showing an example of a correspondence relation between a coordinate axis and parameters in the embodiment of the present invention.

EMBODIMENTS FOR CARRYING OUT THE INVENTION

Configuration of Embodiment

Figure 4:
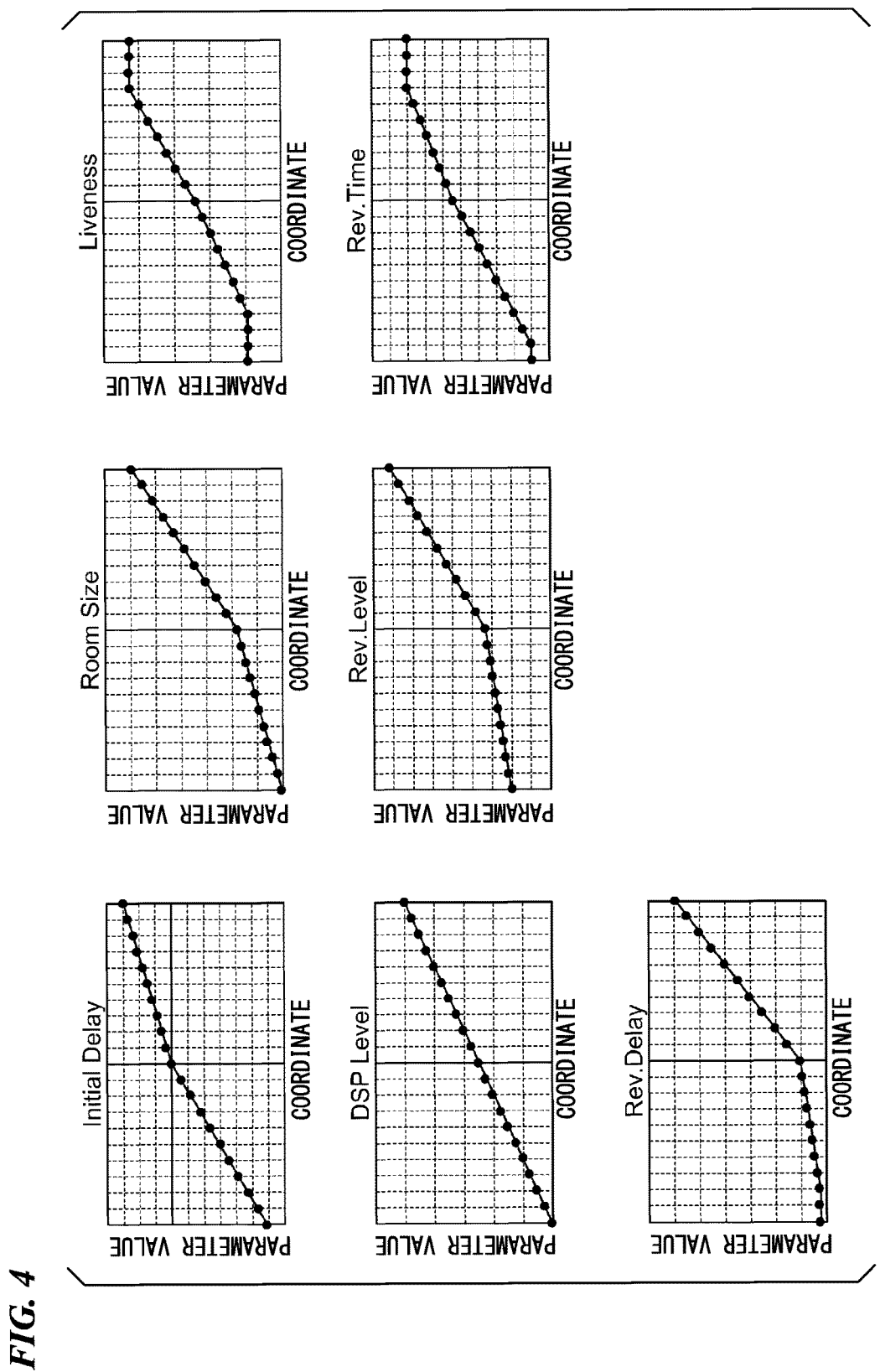
FIG. 4 is a diagram showing an example of mapping of parameter values with respect to the coordinate axis in the embodiment of the present invention.

FIG. 1 is a block diagram showing a configuration of a sound control apparatus 10 according to an embodiment of the present invention. The sound control apparatus 10 includes a control unit 11, an A/D (analog-to-digital) conversion unit 12, an operating unit 13, a display unit 14, a digital signal processing unit 15, a D/A (digital-to-analog) conversion unit 16, a storage unit 17, and a sound emitting unit 18.

The control unit 11 includes an arithmetic device such as a CPU (Central Processing Unit), and a main storage device such as a ROM (Read Only Memory) and a RAM (Random Access Memory). A program group to be executed by the CPU is stored in the ROM. The storage unit 17 may be a storage means having a large capacity such as a hard disk. The storage unit 17 stores a data group and a program group to be used by the control unit 11. The CPU uses the RAM as a work area, and executes programs stored in the ROM and the storage unit 17 to control operations of the respective units of the sound control apparatus 10.

The operating unit 13 may be an operating means including an operating element such as various types of keys or a touch sensor. The operating unit 13 supplies an operation signal corresponding to an operation of a user, to the control unit 11. The control unit 11 performs processing according to the operation signal. The display unit 14 may be a display means including, for example, a liquid crystal panel or a liquid crystal drive circuit. The display unit 14 displays an image under control of the control unit 11. For example, the control unit 11 causes the display unit 14 to display a user interface screen for specifying a sound field desired by the user. The control unit 11 specifies various parameters for realizing the sound field, based on the operation signal from the operating unit 13 and based on a user operation on the user interface screen. The control unit 11, the operating unit 13, the display unit 14, and the storage unit 17 are a configuration for supporting designation of the sound field by the user. The control unit 11, the operating unit 13, the display unit 14, and the storage unit 17 function as a user interface device to specify a parameter value for realizing the sound field desired by the user in response to the user operation.

The A/D conversion unit 12 converts an analog audio signal input to the sound control apparatus 10 in association with playback of a recording medium such as a CD (Compact Disc), to a digital audio signal, and supplies the digital audio signal to the digital signal processing unit 15. The digital signal processing unit 15 performs signal processing for realizing a sound field based on various parameter values. The digital signal processing unit 15 functions as a signal processing unit that performs signal processing for realizing the sound field, based on the parameter values specified by the control unit 11, being the user interface device. The D/A conversion unit 16 converts the digital audio signal supplied from the digital signal processing unit 15, to an analog audio signal, and supplies the analog audio signal to the sound emitting unit 18. The sound emitting unit 18 may be a loudspeaker. The sound emitting unit 18 is arranged at a predetermined position with respect to the user, being a listener. The predetermined position may be a position away from the user, for example, in a front-back direction or a left-right direction. The sound field is realized by the sound emitted from the sound emitting unit 18.

FIG. 2 shows an example of the user interface screen displayed on the display unit 14. The user interface screen shown in FIG. 2 has a coordinate space configured by a plurality of coordinate axes. That is to say, the user interface screen shown in FIG. 2 is associated with a plurality of coordinate axes. The user can designate an arbitrary position in the coordinate space. In the example in FIG. 2, a two-dimensional plane coordinate space is configured by two coordinate axes called as an X axis and a Y axis.

A specific example of the attributes of the sound field may include "extent of the sound field", "strength of the sound field", and "power". One of these attributes corresponds to one coordinate axis. In the example shown in FIG. 2, the X axis corresponds to the extent of the sound field, and the Y axis corresponds to the strength of the sound field. The sound field becomes wider going in a positive direction of the X axis. That is, a sound field space becomes larger going in the X axis positive direction. On the other hand, the sound field becomes narrower going in a negative direction of the X axis. That is, the sound field space becomes smaller going in the negative direction of the X axis. Moreover, the sound field becomes stronger going in a positive direction of the Y axis. That is, the level of reflected sound with respect to direct sound becomes higher going in the positive direction of the Y axis. On the other hand, the sound field becomes weaker going in the negative direction of the Y axis. That is, the level of the reflected sound with respect to the direct sound becomes lower going in the negative direction of the Y axis.

These parameters related to the attributes of the sound field are different from each other. A parameter related to a sound field attribute of "extent of the sound field" may be, for example, initial delay, room size, or liveness. The initial delay is a parameter for deciding a time from the direct sound to initial reflected sound. A sense of distance from a sound source to a wall surface and the size of the sound field space are adjusted by changing a value of the initial delay. The room size is a parameter for deciding a gap in the reflected sound. A sense of extent of the space is adjusted by changing a value of the room size. The liveness is a parameter for deciding how much the reflected sound gradually decreases. How the sound echoes in the space is adjusted by changing a value of the liveness. The parameter related to the sound field attribute of "strength of the sound field" may be, for example, a DSP Level or the liveness. The DSP (Digital Signal Processor) Level is a parameter for controlling the level of the reflected sound with respect to the direct sound. The parameter related to the sound field attribute of "power" is the DSP Level or the initial delay.

FIG. 3 shows a correspondence relation between the respective coordinate axes and the parameters shown in FIG. 2. As shown in the upper part of FIG. 3, a plurality of parameters, namely, initial delay, room size, and liveness are allocated to the X axis corresponding to the extent of the sound field. As shown in the lower part of FIG. 3, one parameter, namely, DPS level is allocated to the Y axis corresponding to the strength of the sound field. A procedure at the time of mapping of the respective parameter values on the coordinate axes is as described below. First, a default value (central value), a maximum value, and a minimum value of the respective parameter values are determined beforehand. Here, the respective values of the initial delay are set as shown in FIG. 3. That is to say, the default value of the initial delay is set to '20 ms'. The minimum value of the initial delay is set to '15 ms'. The maximum value of the initial delay is set to '90 ms'. '20 ms' being the default value is allocated to an origin "(X, Y)=(0, 0)" in the coordinate space. '15 ms' being the minimum value of the initial delay is associated with a coordinate "(X, Y)=(-10, 0)" of the minimum value on the X axis. '90 ms' being the maximum value of the initial delay is allocated to a coordinate "(X, Y)=(10, 0)" of the maximum value on the X axis. A function from the minimum value to the origin passing through the minimum value and the origin, and a function from the origin to the maximum value passing through the origin and the maximum value are determined beforehand. The parameter values of the initial delay present between the minimum value and the origin and between the origin and the maximum point are mapped on the coordinate axis (X axis). The same applies to the room size and the liveness allocated to the X axis. Moreover, the same also applies to the DSP Level allocated to the Y axis. It is desired that the abovementioned functions passing through the minimum value, the origin, and the maximum value are different depending on, for example, the type of the parameters as shown in FIG. 4. A plurality of tables exemplified in FIG. 4 respectively indicate functions indicating a relation between the coordinate values and the parameter values related to the initial delay, the room size, the liveness, the DSP Level, reverb level (Rev. Level), reverb time (Rev. Time), and reverb delay (Rev. Delay). Such a mapping relation between the respective coordinate axes and the parameter values is stored in the ROM or the storage unit 17.

When the user designates a position corresponding to the intensity, the size, and the width of the desired attributes of the sound field on the user interface screen, the parameter values such as the initial delay, the room size, the liveness, and the DSP Level corresponding to the position are specified, and the sound field based on the parameter values is realized. Generally, it is difficult for the user who does not have professional knowledge to understand what kind of sound field is realized by setting which parameter of the initial delay, the room size, the liveness, and the DSP Level to which value. On the other hand, according to the present embodiment, it is not required to designate the parameter value, being difficult for the user to recognize a relation with the sound field, point by point. That is to say, according to the present embodiment, it is only necessary to designate the intensity, the size, and the width of the attributes of the sound field, which are easy for the user to imagine, such as "extent of the sound field", "strength of the sound field", and "power".

Operation of the Embodiment

Figure 5:
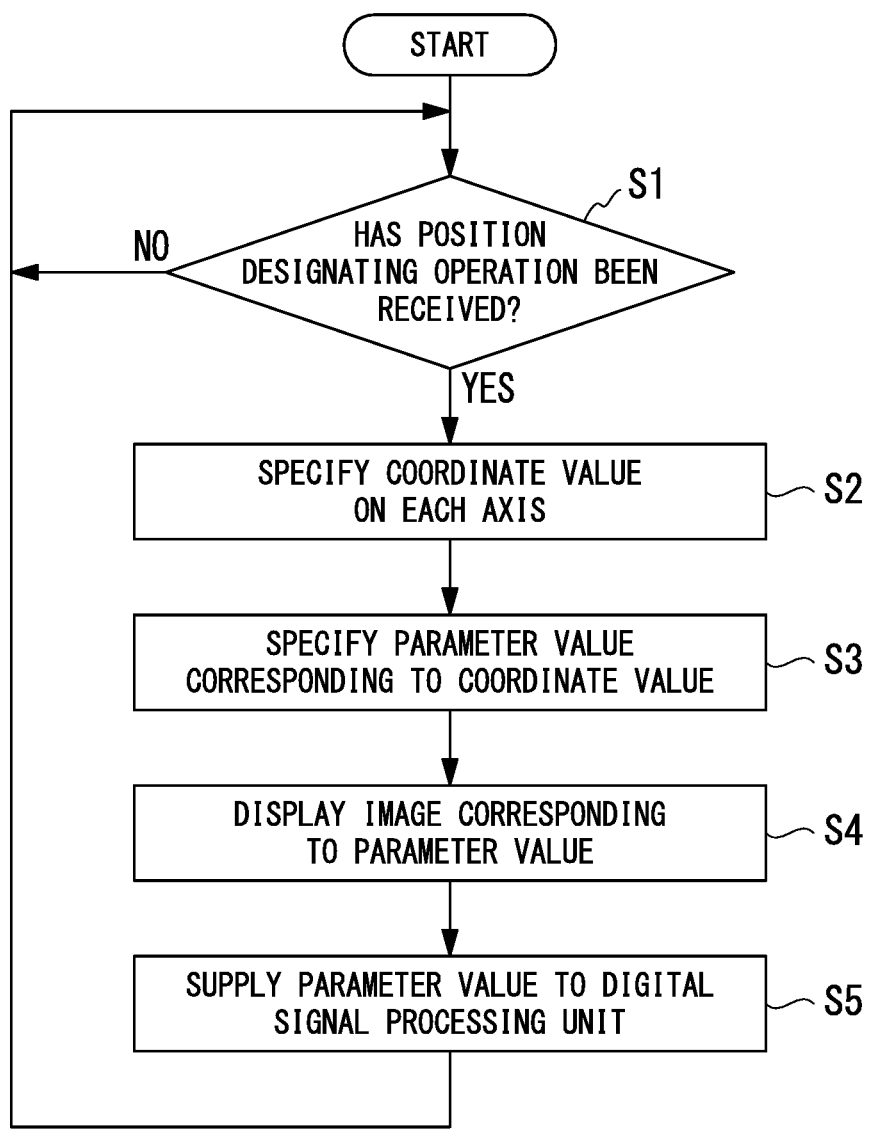
FIG. 5 is a flowchart showing a process procedure of a control unit of the sound control apparatus shown in FIG. 1.

The operation of the embodiment is described next. FIG. 5 is a flowchart showing a process procedure of the control unit 11. At first, as shown in FIG. 2, the control unit 11 (display unit) causes the display unit 14 (display unit) to display the user interface screen in which the coordinate space is formed by the plurality of coordinate axes. The user designates an arbitrary position in the coordinate space on the user interface screen. At this time, the user designates a position corresponding to the intensity, the size, and the width of the attributes of the sound field, while referring to the attributes of the sound field corresponding to the coordinate axis. For example, the user designates a position so as to obtain the sound field desired by him or her, such that the extent of the sound field is set to be slightly narrow and the strength of the sound field is set to be slightly strong. If the operating unit 13 is configured by the keys, the user may designate the position by a pointer that moves in the coordinate space by using the keys. If the operating unit 13 is configured by a touch screen integrated with the display unit 14, the user may designate the position by touching an arbitrary position in the coordinate space displayed on the display unit 14.

Upon reception of a position designating operation (YES in step S1), the control unit 11 (the first specification unit) specifies the coordinate value designated by the user in the coordinate space (step S2). The coordinate value designated at this time is noted as (X1, Y1).

Next, the control unit 11 (the second specification unit) specifies a plurality of types of parameter values corresponding to the coordinate value, based on the type of the parameters allocated to the respective coordinate axes, and the specified coordinate value (X1, Y1) (step S3). More specifically, the control unit 11 specifies a parameter value of the initial delay (noted as I1), a parameter value of the room size (noted as R1), and a parameter value of the liveness (noted as L1) mapped on the X coordinate value X1. Moreover, the control unit 11 specifies a parameter value of the DSP Level (noted as D1) mapped on the Y coordinate value Y1.

Next, the control unit 11 (the display unit) causes the display unit 14 (the display unit) to display an image having the color, the size, or the shape corresponding to the specified parameter values I1, R1, L1, and D1 (step S4).

For example, the control unit 11 may lighten the color of a background image of the coordinate space when these parameter values are values that contribute to widen the sound field as compared with the default value. As another method, the control unit 11 may make the size of an object image that symbolizes the extent of the sound field larger than a reference size. Moreover, as another method, the control unit 11 may make the number of corners of an object image having a polygonal shape smaller. More specifically, when the object image corresponding to the default value is an octagon, the control unit 11 changes the image to a pentagon or a triangle according to the parameter values.

On the contrary, for example, the control unit 11 may deepen the color of the background image of the coordinate space when these parameter values are values that contribute to narrow the sound field as compared with the default value.

As another method, the control unit 11 may make the size of the object image that symbolizes the extent of the sound field smaller than the reference size. Moreover, as another method, the control unit 11 may make the number of corners of the object image having the polygonal shape larger. More specifically, when the object image corresponding to the default value is an octagon, the control unit 11 changes the image to a decagon or a circle according to the parameter values.

The control unit 11 may change the color of the background image of the coordinate space so as to approach a red color when these parameter values are values that contribute to strengthen the sound field as compared with the default value. More specifically, when the color of the background image corresponding to the default value is yellow, the control unit 11 changes the color to orange or red according to the parameter value. As another method, the control unit 11 may make the size of the object image that symbolizes the strength of the sound field larger than the reference size. Moreover, as another method, the control unit 11 may make the number of corners of the object image having a polygonal shape smaller.

On the contrary, for example, the control unit 11 may change the color of the background image of the coordinate space so as to approach a blue color when these parameter values are values that contribute to weaken the sound field as compared with the default value. More specifically, when the color of the background image corresponding to the default value is yellow, the control unit 11 changes the color to green or blue according to the parameter value. As another method, the control unit 11 may make the size of the object image that symbolizes the strength of the sound field smaller. Moreover, as another method, the control unit 11 may make the number of corners of the object image having a polygonal shape larger.

The user can recognize a change of the sound field visually by observing the change of the image or the background image.

The control unit 11 supplies these parameter values I1, R1, L1, and D1 to the digital signal processing unit 15 (step S5). The digital signal processing unit 15 uses these parameter values I1, R1, L1, and D1 to perform signal processing for realizing the sound field. The sound emitting unit 18 emits sound corresponding to the digital audio signal supplied via the D/A conversion unit 16. As a result, the sound field is reproduced with respect to the user.

According to the above embodiment, the plurality of parameters for realizing the sound field having such attributes change in synchronization with each other, depending on the intensity, the size, or the width of the attributes (for example, the strength of the sound field, the extent of the sound field, and the power) of the sound field designated by the user. As a result, it is not required to designate the plurality of parameters point by point by the user individually, and the desired sound field can be realized simply and intuitively by only designating one point in the coordinate space.

MODIFICATION EXAMPLES

First Modification Example

The present invention is not limited to the above-described embodiment, and the plurality of types of parameters may be allocated to one coordinate axis corresponding to the attribute of the sound field. The plurality of types of parameters may be allocated to each of the plurality of coordinate axes.

Three or more attributes of the sound field may be set, and three or more coordinate axes corresponding to the attributes of the sound field may be set. In the case of three coordinate axes, the coordinate space becomes a three-dimensional space.

The types of the parameters are not limited to the types exemplified in the description of the embodiment. Other parameters can be handled in the same manner.

Second Modification Example

The same type of parameter may be allocated redundantly to at least two coordinate axis groups. As a specific example, the initial delay, the room size, and the liveness may be allocated to the X axis corresponding to the strength of the sound field, and the DSP Level and the initial delay may be allocated to the Y axis corresponding to the power. In this case, the initial delay is allocated redundantly to the X axis and the Y axis. A priority order is decided in each coordinate axis group (X axis and Y axis) allocated with the same type of parameter, and the priority order is stored in the ROM or the storage unit 17.

As a specific example, a case where the priority order of the X axis corresponding to the strength of the sound field is high, and the priority order of the Y axis corresponding to the power is low will be described. A weight coefficient a is allocated to the X axis. A weight coefficient b is allocated to the Y axis. The weight coefficients a and b indicate the priority order. The weight coefficient a is larger than the weight coefficient b (a>b). In this case, the control unit 11 (the second specification unit) first specifies the parameter values I1, R1, and L1 of the initial delay, the room size, and the liveness mapped on the X coordinate value, based on the type of the parameters allocated to the respective coordinate axes and the specified coordinate value. Moreover, the control unit 11 specifies a parameter value I2 of the DSP Level and the parameter value D1 of the initial delay mapped on the Y coordinate value Y1. As a result, two values of I1 and I2 are specified as the parameter values of the initial delay. In the second modification example, the control unit 11 does not directly use these parameter values I1 and I2 as the parameter values of the initial delay. That is to say, the control unit 11 specifies the parameter value I of the initial delay by a predetermined operation using I1 and I2 and the weight coefficients a and b. As a specific example, the control unit 11 performs the operation of "I=a×I1+b×I2" to specify the parameter value I of the initial delay. Thus, the control unit 11 may specify the above-described parameter values by the predetermined operation in the respective coordinate axes allocated with the same type of parameter.

Third Modification Example

A case where the two-dimensional plane coordinate space is configured by two coordinate axes of the X axis and the Y axis has been described as an embodiment (refer to FIG. 2). However, the number of the coordinate axes and the coordinate spaces are not limited to the example of the embodiment. For example, in the third modification example, because the sound control apparatus 10 expresses the extent of the entire sound field space on the user interface screen, a spherical image in which a part of a sphere is represented sterically is displayed. The size of the spherical image changes according to the operation of the user. The sound control apparatus 10 specifies the coordinate value in one coordinate axis, namely, an R axis, based on the size of the spherical image. Moreover, the sound control apparatus 10 also displays an image representing sound generated in the sound field, on the user interface screen.

Figure 6:
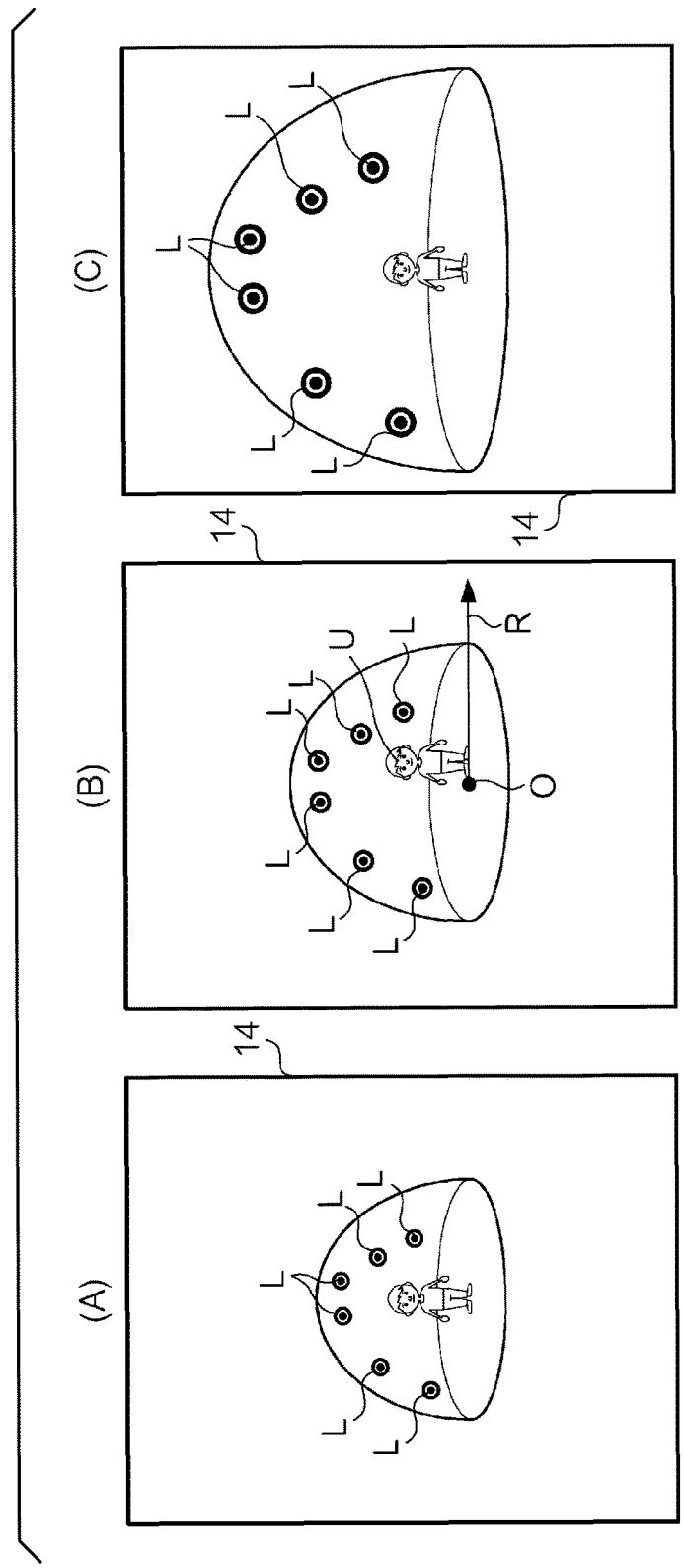
FIG. 6 is a diagram showing an example of a user interface screen displayed on a display unit of a sound control apparatus according to a third modification example of the present invention.

FIG. 6 shows an example of the user interface screen to be displayed on the display unit 14 of the sound control apparatus 10. On the user interface screen, a so-called domed image having a hemispherical shape (hereinafter, referred to as a hemispherical image D), being an example of the spherical image is displayed. A user image U indicating a user, being a listener, is displayed at an origin O corresponding to the center of the hemisphere. The hemispherical image D represents the attribute of the sound field of the "extent of the entire sound field space" obtained by combining the extent in a height direction and a horizontal direction of the sound field space.

Figures 7, 8:
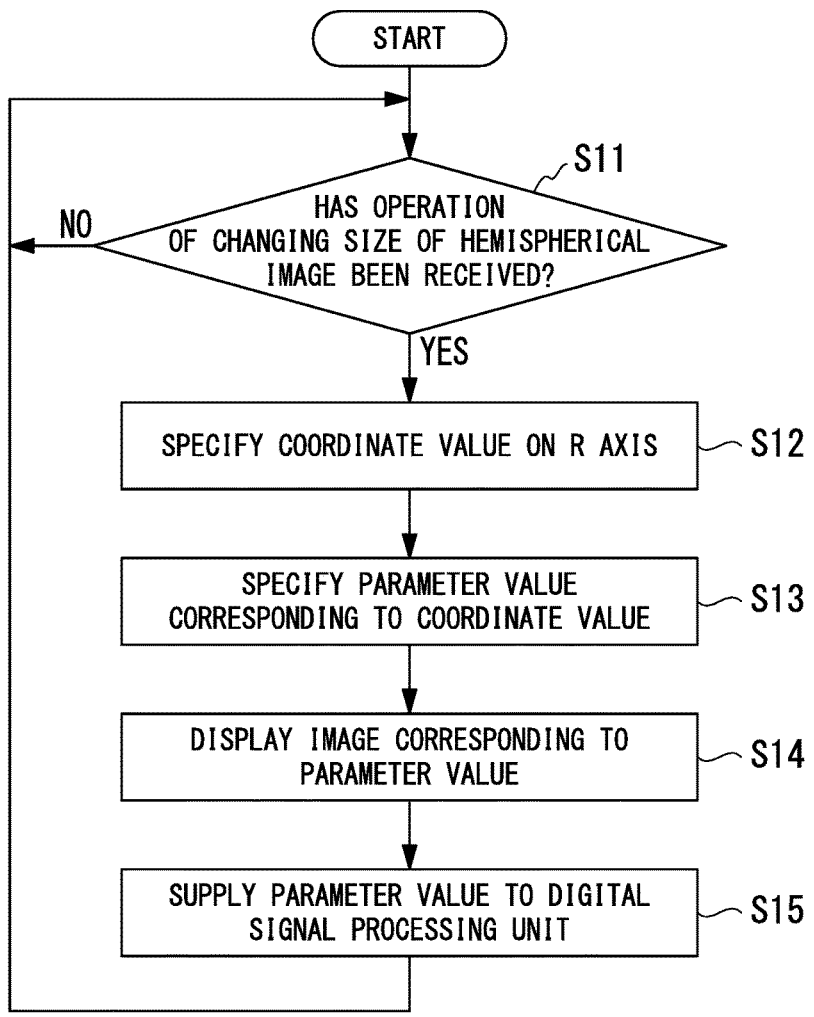
FIG. 7 is a diagram showing an example of parameter values allocated to an R axis in the third modification example.
FIG. 8 is a flowchart showing a process procedure of a control unit in the third modification example.

The "extent of the entire sound field space" is decided by the coordinate value of the R axis, being an index of the size of the hemisphere image D in a radial direction. That is to say, the R axis is a coordinate axis extending in a direction away from the origin O, with the origin O serving as a base point. The parameters allocated to the R axis are the DSP Level, the initial delay, the room size, the liveness, the reverb delay, the reverb time, the reverb level, and so on. As shown in FIG. 7, for example, the minimum value, the central value (default value), and the maximum value are set to the respective parameters allocated to the R axis. These values are stored in the storage unit 17. The control unit 11 of the sound control apparatus 10 stores beforehand in the storage unit 17, for example, a function passing through the minimum value and the central value, and a function passing through the central value and the maximum value. Moreover, the respective parameter values present between the minimum value and the central value and between the central value and the maximum value are mapped on the coordinate axis (R axis) based on these minimum value, the central value, the maximum value, and the functions.

A case where the operating unit 13 is configured by a touch screen integrated with the display unit 14 is described.

At first, a case where, while a user places a plurality of fingers in contact with a display area where the hemispherical image D is displayed, on the user interface screen shown in portion (B) of FIG. 6, the user performs an operation of bringing respective fingers close to each other (so-called, pinch-in), is described. In this case, the operating unit 13 receives the operation as an operation to change (reduce) the size of the hemispherical image D, and supplies an operation signal according to the operation to the control unit 11 (YES in step S11 in FIG. 8). As shown in portion (A) of FIG. 6, the control unit 11 causes the display unit 14 to display the hemispherical image D with the size being reduced with a ratio according to the operation amount at this time, based on the operation signal. The control unit 11 (the first specification unit) specifies the coordinate value on the R axis (that is, a spherical diameter of the hemispherical image D) (step S12 in FIG. 8). Display of the arrow indicating the R axis in (B) portion of FIG. 6 is not essential.

Next, a case where, while the user places the plurality of fingers in contact with the display area where the hemispherical image D is displayed, on the user interface screen shown in portion (B) of FIG. 6, the user performs an operation of bringing the respective fingers away from each other (so-called, pinch-out), is described. In this case, the operating unit 13 receives the operation as an operation to change (enlarge) the size of the hemispherical image D, and supplies the operation signal according to the operation to the control unit 11 (YES in step S11 in FIG. 8). As shown in portion (C) of FIG. 6, the control unit 11 causes the display unit 14 to display the hemispherical image D with the size being enlarged with a ratio according to the operation amount at this time, based on the operation signal. The control unit 11 (the first specification unit) specifies the coordinate value on the R axis (that is, a spherical diameter of the hemispherical image D) (step S12 in FIG. 8).

The operation to change the size of the hemispherical image D is not limited to the above-described pinch-in or pinch-out, and may be any method. For example, the user brings his or her fingers in contact with the display area where the hemispherical image D is displayed, and the operating unit 13 may detect an operation of moving the fingers in a direction away from the origin O or in a direction approaching the origin O. When the detected operation is an operation of moving the fingers in the direction away from the origin O, the control unit 11 may display an enlarged hemispherical image D in the display unit 14. When the detected operation is an operation of moving the fingers in the direction approaching the origin O, the control unit 11 may display a reduced hemispherical image D in the display unit 14.

The control unit 11 (second specification unit) specifies the plurality of types of parameter values (the above-described DSP Level, initial delay, room size, liveness, reverb delay, reverb time, reverb level, and the like) corresponding to the coordinate value, based on the above-described specified coordinate value (step S13 in FIG. 8). Then the control unit 11 (the display unit) displays the image having the color, the size, or the shape corresponding to the specified parameter values, in the display unit 14 (the display unit) (step S14 in FIG. 8).

The control unit 11 supplies these parameter values to the digital signal processing unit 15 (step S15 in FIG. 8). The digital signal processing unit 15 performs the signal processing for realizing the sound field by using these parameter values. The sound emitting unit 18 emits sound corresponding to the digital audio signal supplied via the D/A conversion unit 16. As a result, the sound field is reproduced.

In step S14 in FIG. 8, the control unit 11 displays an image representing the sound generated in the sound field. The sound includes direct sound and pseudo-reflected sound. The direct sound is sound represented by the audio signal input from the A/D conversion unit 12 to the digital signal processing unit 15. The pseudo-reflected sound is sound when the direct sound is reflected in a virtual sound field, and is sound for realizing the sound field corresponding to the parameter values specified based on the user operation. The pseudo-reflected sound is generated by the digital signal processing unit 15.

Figure 9:
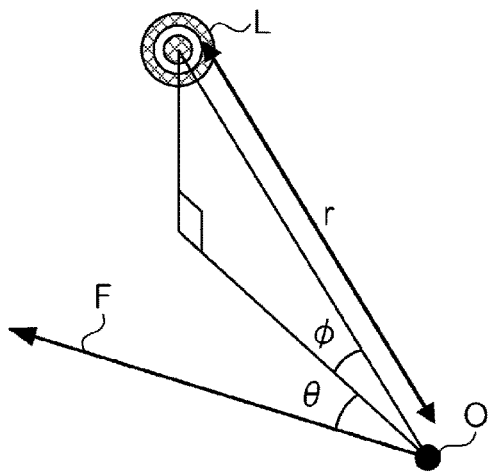
FIG. 9 is a diagram explaining a method of generating an image of pseudo-reflected sound in the third modification example.

FIG. 9 is a diagram for explaining a method of generating an image of the pseudo-reflected sound (referred to as pseudo-reflected sound image). The control unit 11 causes the display unit 14 to display the pseudo-reflected sound image. The control unit 11 sets a display position of the pseudo-reflected sound image at a position defined by a horizontal angle θ from the origin O (0° at front) and a vertical angle (φ) (0° in the horizontal direction) by using the size corresponding to a delay time of the direct sound from the sound source to the origin O as a distance r, in the coordinate space described above. The arrow F in FIG. 9 denotes a preset front direction.

The control unit 11 changes the size of the pseudo-reflected sound image according to a ratio of the level of the reflected sound with respect to the level of direct sound. For example, the control unit 11 changes the size of the pseudo-reflected sound image so as to be increased, as the ratio of the level of reflected sound with respect to the level of direct sound increases. When the signal value of the audio signal input from the A/D conversion unit 12 to the digital signal processing unit 15 is at a predetermined level or higher, the control unit 11 calculates the display position of the pseudo-reflected sound with the audio signal serving as the direct sound, and generates and displays the pseudo-reflected sound image having the above-described size at the display position.

As a specific example, a case where the audio signal to be input has a 3-channel configuration of an R channel, an L channel, and a C channel is described. In this case, the control unit 11 generates an image of the direct sound corresponding to the R channel, an image of the direct sound corresponding to the L channel, and an image of the direct sound corresponding to the C channel. Moreover, the control unit 11 generates the pseudo-reflected sound image corresponding to the display position and the level calculated from a result in which these direct sounds are mixed down. The control unit 11 displays these images on the user interface screen of the display unit 14. These images are circular image groups L shown in FIG. 6. These images may be still images. The pseudo-reflected sound image with respect to the direct sound may change its position and size every second, and may be displayed as an animation. Display of the image of the direct sound is not essential. At the time of displaying the image of the direct sound, it is preferable to represent the image of the direct sound by an image different from the pseudo-reflected sound image (for example, an image having a different color or shape).

According to the third modification example, the plurality of parameter values are allocated to one coordinate axis, and the size of the image representing the extent of the sound field space changes, and the respective parameter values are changed according to the user operation. That is to say, the user need only to designate the size of the spherical image with respect to the attribute of one sound field (the extent of the sound field space), which is easily imagined by the user, and need not designate the parameter values whose relation with the sound field is difficult to recognize, point by point. Moreover, the user can intuitively understand which sound field is being reproduced and which pseudo-reflected sound is being generated, by displaying the pseudo-reflected sound image.

The image indicating the direct sound and the pseudo-reflected sound is not limited to the exemplified circular image, and may be an image having other shapes (for example, a vector image or an image looking like a cloud). The method can be such that as an image indicating frequency characteristics, display of a vector going from a sound source position toward a listening position is performed in the case of high sound, and an icon extending from the sound source position circumferentially is displayed in the case of low sound.

Fourth Modification Example

In the above-described embodiments, the digital signal processing unit 15, the D/A conversion unit 17, and the sound emitting unit 18 are provided in the sound control apparatus 10. However, the configuration is not limited thereto. The digital signal processing unit 15, the D/A conversion unit 17, and the sound emitting unit 18 may be provided in a device independent of the sound control apparatus 10. A specific example is shown in FIG. 10.

Figure 10:
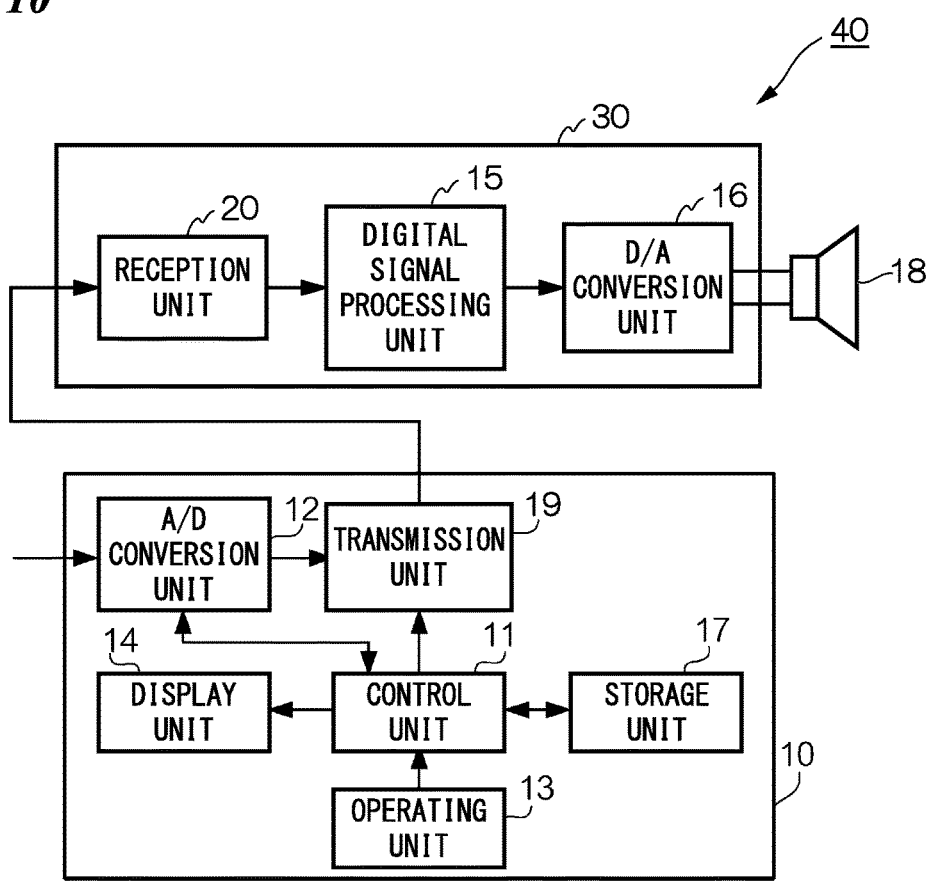
FIG. 10 is a block diagram showing a configuration of a sound system according to a fourth modification example of the embodiment of the present invention.

FIG. 10 is a block diagram showing a configuration of a sound system 40 according to a fourth modification example of the embodiment of the present invention. Regarding the sound system 40 shown in FIG. 10, configuration the same as shown in FIG. 1 is denoted by the same reference symbols, and detailed description thereof is omitted.

The sound system 40 includes the sound control apparatus 10 and a sound apparatus 30. The sound control apparatus 10 and the sound apparatus 30 are connected to each other via a cable or wireless.

The control unit 11 outputs the specified parameter values to a transmission unit 19. The D/A conversion unit 16 outputs an analog audio signal to the transmission unit 19. The transmission unit 19 transmits the parameter values and the analog audio signal to the sound apparatus 30. A reception unit 20 receives the parameter values and the analog audio signal transmitted from the sound control apparatus 10. The reception unit 20 supplies the received parameter values and the analog audio signal to the D/A conversion unit 16.

Fifth Modification Example

The present invention can also be specified as a program for causing a computer corresponding to the user interface device or the sound control apparatus to realize the present invention, or as a recording medium such as an optical disk that stores the program therein. The program according to the present invention can be provided in a format in which the program is downloaded and installed to the user interface device or the sound control apparatus via a network such as the Internet and used. The display unit, the first specification unit, and the second specification unit may be realized by executing the program by the computer.

INDUSTRIAL APPLICABILITY

The present invention may be applied to a user interface device, a sound control apparatus, a sound system, a sound control method, and a program.

REFERENCE SYMBOLS

10 Sound control apparatus
11 Control unit
12 A/D conversion unit
13 Operating unit
14 Display unit
15 Digital signal processing unit
16 D/A conversion unit
17 Storage unit
18 Sound emitting unit

The invention claimed is:

1. A sound system comprising a sound control apparatus and sound apparatus independent of each other,
   the sound control apparatus including:
   a display unit that displays a user interface screen associated with a first coordinate axis, the first coordinate axis corresponding to a first attribute of a sound field and being allocated with a plurality of parameters related to the first attribute;
   a first specification unit that specifies a coordinate value of the first coordinate axis corresponding to a position in the user interface screen specified by a user;
   a second specification unit that specifies a value of each of the plurality of parameters, based on the specified coordinate value; and a transmission unit that transmits the specified value of each of the plurality of parameters to the sound apparatus, and the sound apparatus including:

a reception unit that receives the transmitted value of each of the plurality of parameters, and a signal processing unit that performs signal processing for realizing a sound field, based on the received value of each of the plurality of parameters.

2. The sound system according to claim 1, wherein the user interface screen includes a stereoscopic image, and the display unit changes the image according to at least one of the specified values of the parameters.

3. The sound system according to claim 1, wherein the user interface screen is associated with the first coordinate axis and a second coordinate axis, the second coordinate axis corresponding to a second attribute of the sound field and being allocated with a parameter related to the second attribute, the first specification unit specifies a coordinate value of the second coordinate axis corresponding to the position in the user interface screen specified by the user, and the second specification unit specifies a value of the parameter related to the second attribute, based on the specified coordinate value of the second coordinate axis.

4. The sound system according to claim 3, wherein the parameter allocated to the second coordinate axis is the same as one of the plurality of parameters related to the first attribute, and the second specification unit specifies a value of the parameter allocated to the second coordinate axis, based on the specified coordinate values of the first and second coordinate axes.

5. The sound system according to claim 3, wherein the second coordinate axis is allocated with a plurality of parameters related to the second attribute, and the second specification unit specifies a value of each of the plurality of parameters allocated to the second coordinate axis, based on the specified coordinate value of the second coordinate axis.

6. The sound system according to claim 1, wherein the user interface screen includes an image, and the display unit changes the image according to at least one of the specified parameters.

7. The sound system according to claim 6, wherein the display unit changes a color, size, or shape of the image according to at least one of the specified values of the parameters.

8. A sound control method for a sound system comprising a sound control apparatus and a sound apparatus independent of each other, the sound control method comprising:

displaying, by a display unit of the sound control apparatus, a user interface screen associated with a first coordinate axis, the first coordinate axis corresponding to a first attribute of a sound field and being allocated with a plurality of parameters related to the first attribute;

specifying, by a first specification unit of the sound control apparatus, a coordinate value of the first coordinate axis corresponding to a position in the user interface screen specified by a user;

specifying, by a second specification unit of the sound control apparatus, a value of each of the plurality of parameters, based on the specified coordinate value;

transmitting, by a transmission unit of the sound control apparatus, the specified value of each of the plurality of parameters to the sound apparatus;

receiving, by a reception unit of the sound apparatus, the transmitted value of each of the plurality of parameters; and performing, by a signal processing unit of the second apparatus, signal processing for realizing a sound field, based on the received value of each of the plurality of parameters.

9. A non-transitory computer-readable recording medium storing a program that causes a computer serving as a sound control apparatus to execute:

displaying a user interface screen associated with a first coordinate axis, the first coordinate axis corresponding to a first attribute of a sound field and being allocated with a plurality of parameters related to the first attribute;

specifying a coordinate value of the first coordinate axis corresponding to a position in the user interface screen specified by a user;

specifying a value of each of the plurality of parameters, based on the specified coordinate value; and transmitting the specified value of each of the plurality of parameters to the sound apparatus, the program causing a computer serving as a sound apparatus to execute;

receiving the transmitted value of each of the plurality of parameters; and performing signal processing for realizing a sound field, based on the received value of each of the plurality of parameters.

* * * * *